US 9,086,478 B2

(12) United States Patent
Cook

(10) Patent No.: US 9,086,478 B2
(45) Date of Patent: Jul. 21, 2015

(54) SATELLITE RADIOLOCALIZATION RECEIVER

(75) Inventor: John Owen Cook, Suffolk (GB)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 12/599,249

(22) PCT Filed: Jun. 4, 2008

(86) PCT No.: PCT/EP2008/056890
§ 371 (c)(1),
(2), (4) Date: Nov. 6, 2009

(87) PCT Pub. No.: WO2008/148785
PCT Pub. Date: Dec. 11, 2008

(65) Prior Publication Data
US 2010/0149035 A1 Jun. 17, 2010

(30) Foreign Application Priority Data
Jun. 8, 2007 (EP) ...................................... 07109938

(51) Int. Cl.
G01S 19/26 (2010.01)
G01S 19/45 (2010.01)
G01S 19/05 (2010.01)
G01S 19/06 (2010.01)

(52) U.S. Cl.
CPC ...................................... G01S 19/26 (2013.01)

(58) Field of Classification Search
CPC ....................................................... G01S 19/26
USPC .............. 342/357.65, 357.28, 357.42, 357.43
See application file for complete search history.

(56) References Cited

U.S. PATENT DOCUMENTS

| 4,164,898 | A | * | 8/1979 | Burgess et al. | .................. 454/72 |
| 5,216,611 | A | * | 6/1993 | McElreath | .................... 701/472 |
| 5,592,173 | A | | 1/1997 | Lau et al. | |
| 5,646,857 | A | * | 7/1997 | McBurney et al. | ........... 701/475 |
| 5,663,735 | A | | 9/1997 | Eshenbach | |
| 6,281,797 | B1 | * | 8/2001 | Forster et al. | .............. 340/572.3 |
| 6,381,540 | B1 | * | 4/2002 | Beason et al. | ................ 701/468 |
| 6,882,308 | B2 | * | 4/2005 | Farine et al. | ................ 342/357.3 |
| 6,972,715 | B2 | * | 12/2005 | Hollis et al. | .............. 342/357.57 |
| 7,019,689 | B1 | * | 3/2006 | McBurney et al. | ...... 342/357.64 |
| 8,009,088 | B2 | * | 8/2011 | Berlin et al. | ............. 342/357.52 |
| 2002/0017989 | A1 | * | 2/2002 | Forster et al. | ................. 340/540 |
| 2010/0204916 | A1 | * | 8/2010 | Garin | ........................... 701/208 |

(Continued)

OTHER PUBLICATIONS

International Search Report and Written Opinion—PCT/EP2008/056890, International Searching Authority—European Patent Office, Oct. 22, 2008.

Primary Examiner — Jack W Keith
Assistant Examiner — Frank J McGue
(74) Attorney, Agent, or Firm — Linda G. Gunderson

(57) ABSTRACT

The invention uses information gathered from a barometric pressure sensor, connected to a GNSS receiver, to choose an optimal acquisition strategy. In an example, the device of the invention includes a pressure sensor, which is sampled at low rate during power off phases, to store a pressure profile, and a processor programmed to detect the signature of a pressurized-cabin airliner. In this way the GPS receiver can determine if the unit has been flown during an inactivity period, and estimate the duration of the flight. The advantage lies in improving the user experience by shortening the Time to First Fix after air travel.

10 Claims, 2 Drawing Sheets

(56) References Cited

U.S. PATENT DOCUMENTS

2010/0267375 A1* 10/2010 Lemmon et al. ............ 455/418
2010/0315287 A1* 12/2010 Karpitski ................ 342/357.28
2011/0057836 A1* 3/2011 Ische et al. ............ 342/357.43
2011/0063167 A1* 3/2011 Gum et al. ............. 342/357.65
2011/0122023 A1* 5/2011 Goudon et al. .......... 342/357.65
2011/0227788 A1* 9/2011 Lundgren et al. ........ 342/357.28

* cited by examiner

SATELLITE RADIOLOCALIZATION RECEIVER

FIELD OF THE INVENTION

Embodiments of the present invention are concerned with satellite radiolocalization systems and radiolocalization satellite acquisition methods and, in particular, devices and methods permitting a faster acquisition of satellite signals. The present invention further concern a portable unit using a barometric pressure sensor to enhance acquisition of satellites and reduce the time to a first positional fix at power-up.

DESCRIPTION OF RELATED ART

Currently GPS receivers use time and velocity assumptions to calculate a maximum position uncertainty from the last validated position. The position uncertainty is important to be able to accurately calculate satellite visibility and Doppler uncertainties when the receiver is turned on after a period of inactivity. The goal of any receiver is to accurately estimate the position uncertainty; if the estimate is too optimistic the satellite search will be too narrow and satellites will be missed, if the estimate is too pessimistic the search will be unnecessarily wide and take longer than required. Both are undesirable and translate into a degraded user experience through extended time to first fix.

Typically, in receivers implementing time based algorithms, different position uncertainty hypothesis are tested, most likely first, followed by a change to a new, more relaxed, hypothesis if the first fails. This sequence will continue until the final hypothesis—a full sky search—where no assumptions about position are used, is tested.

In addition to a purely time based position uncertainty hypothesis, a maximum user velocity may also be used to increase the position uncertainty as a function of time since last validated fix. The maximum velocity is chosen to reflect the target market—for instance a product intended for car navigation would, most likely, select a maximum velocity appropriate to vehicle speeds. Limiting the velocity to a probable value will provide the best user experience by optimizing the time to first fix. The limitation with velocity based algorithms is that velocity assumptions, and therefore the position uncertainty, will be invalidated if the receiver is taken by plane. In this event velocity based algorithms will fail completely and the receiver will be forced to rely on the time based algorithms, described in the preceding paragraph, to recover.

It is an aim of the present invention to provide a positioning system free from the above shortcomings.

BRIEF SUMMARY OF THE INVENTION

According to the invention, this aim is achieved by means of the device which is the object of the appended claims.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

The invention uses a pressure sensor and knowledge of the characteristics of air pressure variation within a pressurized aircraft to give a GNSS receiver additional information regarding the position uncertainty.

Figure 1:
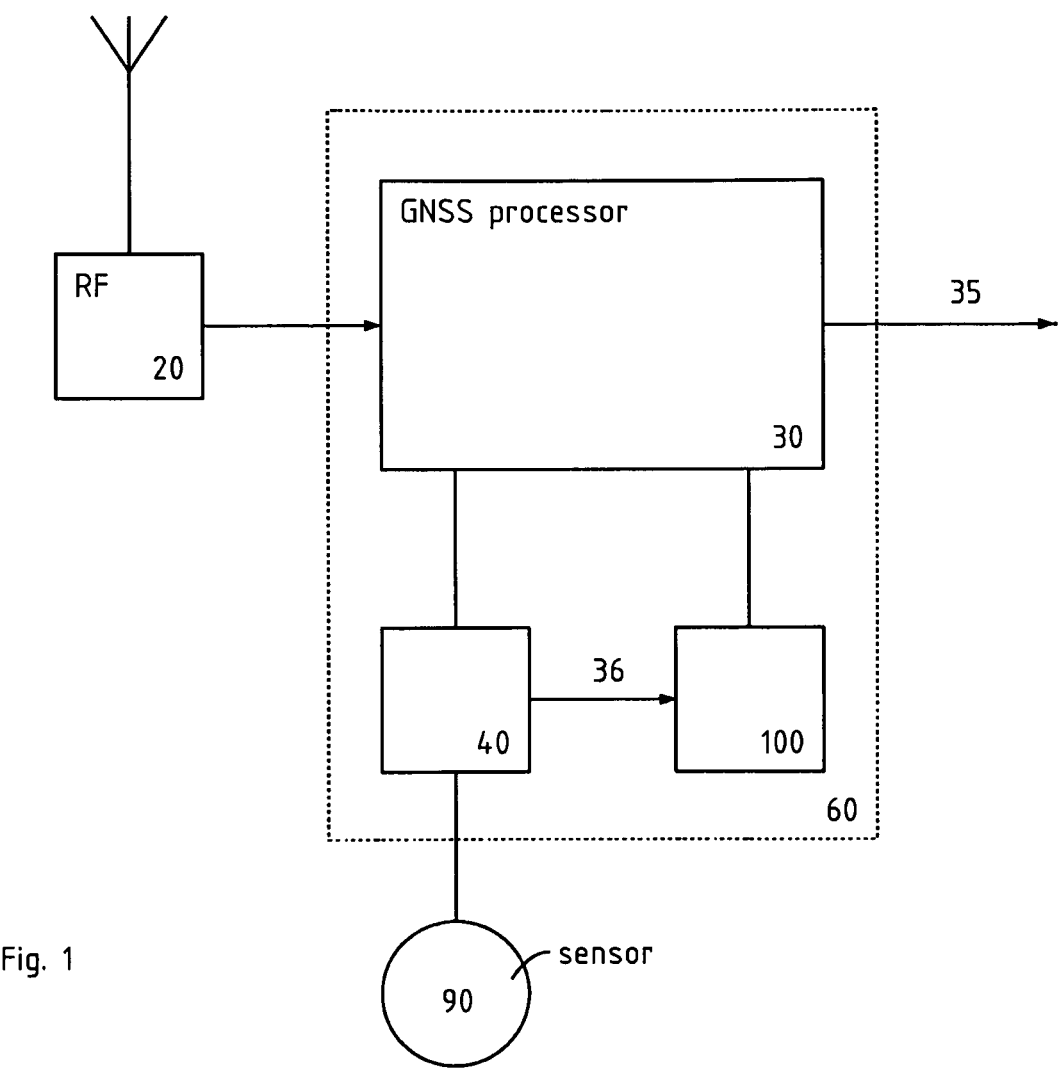
FIG. 1 shows schematically a possible implementation of the present invention.

According to FIG. 1, the GNSS device of the invention includes a GNSS processor a portable device according to one aspect of the invention comprises a satellite radiolocalization receiver, including an antenna and a RF front-end 20 arranged to receive radiolocalization signal from a constellation of positioning satellites, for example GPS, GLONASS or Galileo satellites, and condition them in a form suitable for the GNSS processor 30, for example a carrier-stripped signal or a low-IF signal in digital or analogue format. GNSS processor 30 deals with the radiolocalization signals and extracts, as it is known in the art, position data 35 comprising both horizontal coordinates, for example latitude and longitude, and altitude data as well.

According to one aspect of the invention, a pressure readout unit 40 is arranged to read input from a barometric sensor 90, for example am electronic sensor of absolute pressure open to the local atmospheric pressure, and provide pressure data 36, for example as digital pressure values in a standard unit, like kPa or mbar. Preferably GNSS processor 30 and pressure readout unit 40 are realized in a single electronic component 60, for example a single integrated circuit, including an input for a barometric pressure sensor 90.

GNSS processor 30 is programmed, in a known way, to carry out acquisition and tracking of signals from radiolocalization satellites. In order to preserve power, GNSS processor 30 foresees a low-power mode, or sleep mode, during which most of its functions are switched off. Typically satellite tracking is suspended and no position fix is generated in sleep mode. Pressure readout unit 40, however, remains active during low-power mode and is arranged to interrogate periodically the pressure sensor 90 and to buffer the pressure values so obtained. Pressure reading does not require large power resources, and pressure variations are sufficiently slow, even in a pressurized airplane, so that the readout rate can be chosen low, in order to contain power use. Pressure data gathered during low-power periods is stored in a memory area 100, preferably included in the GNSS processor 30.

A memory 100 records the changes in the pressure 36 over time and is further coupled to the GNSS processor 30 providing position data 35.

Figure 2:
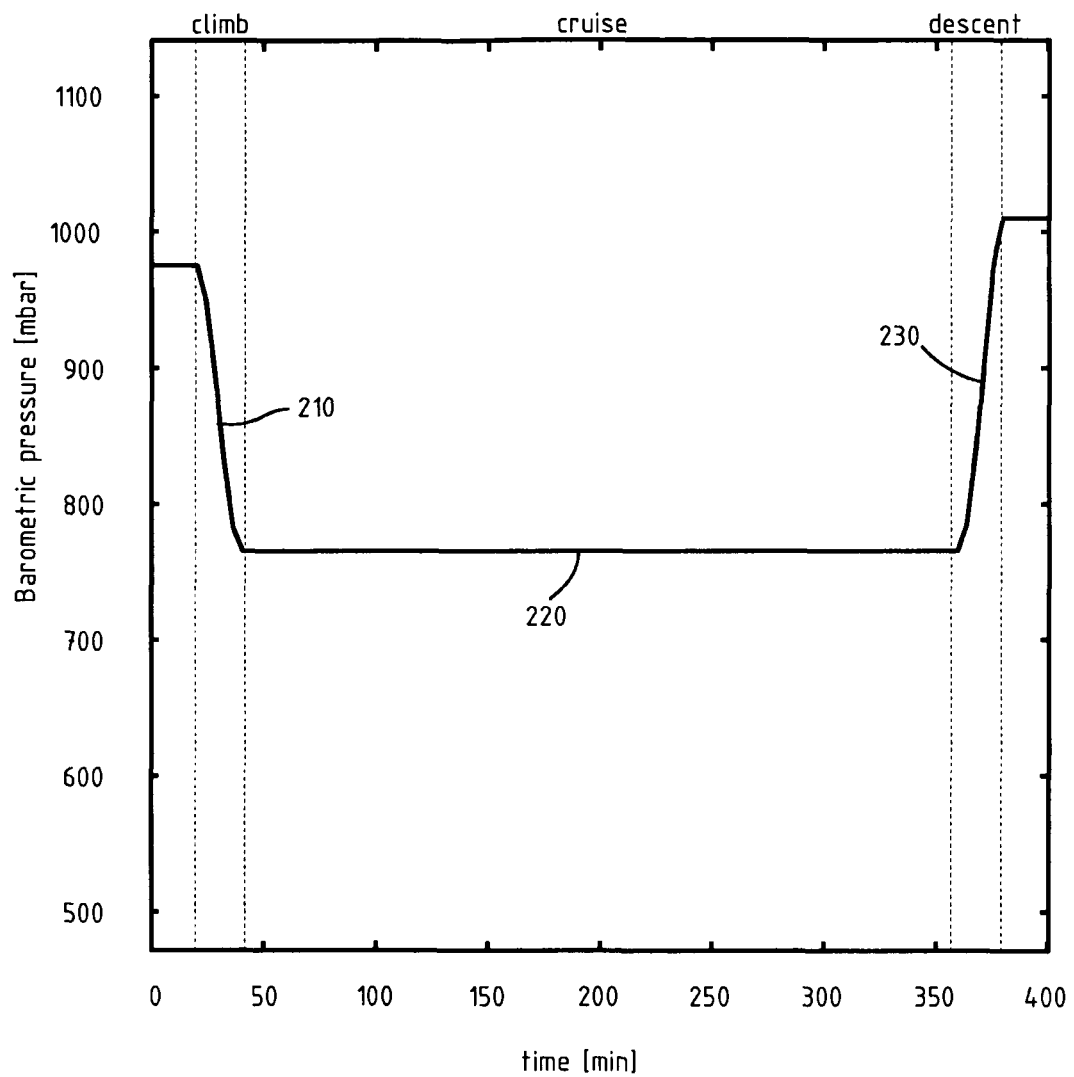
FIG. 2 illustrates, in diagrammatic form, a typical evolution of the barometric pressure during the flight of a commercial airplane.

Within a pressurized aircraft the pressure pattern is unique: 0.8 bar is sustained during the flight with the change to outside pressure taking place very quickly—typically within 10 minutes at either end of the flight. This has nothing to do with the actual altitude of the aircraft, but is determined by the design of the aircraft systems. FIG. 2 illustrate a typical pressure profile, during a flight connecting two cities at different altitudes. It comprises a rapid initial pressure drop 210 corresponding to the ascent of the plane, followed by a relatively longer phase 220 of constant pressure during the cruise, and concluded by a rapid increase of pressure 230 before landing. While pressure, of course, varies with altitude, the unique pressure pattern is too extreme to be seen during normal receiver use. At power up, or at the beginning of a signal acquisition, the GNSS processor is arranged to consult the pressure data stored in memory 100 and detect whether an air journey has taken place. The duration of the cruise phase 220 can be used to deduce an approximate distance traveled and used within the GPS receiver or associated applications.

Within a GPS receiver, the knowledge that an air journey has taken place may be used to overcome the limitations of the time and velocity based algorithms described in the preceding section.

With time based algorithms, most likely hypotheses of position uncertainty are tested first. Knowledge that the receiver has been transported by air allows too optimistic hypotheses to be discarded immediately, enhancing the user experience by shortening the time to obtain the first fix. Knowledge of the flight duration may also be incorporated into the algorithm to provide the best estimate of position uncertainty.

Further estimates of the position uncertainty may be derived by the altitude at landing, as given by the barometric sensor, and by the knowledge that the landing destination must be a registered airport, whose coordinates are known to the GNSS device.

For velocity based algorithms the detection of air travel is important in knowing the assumptions regarding maximum velocity have been broken. In a similar way to time based algorithms the original position uncertainty can be discarded and replaced with a more pessimistic estimate allowing a wider satellite search. Again knowledge of flight duration may be used to provide a more accurate estimate of position uncertainty.

External to the GPS receiver, knowledge of large position change is also useful. For instance exit from an aircraft could be used within applications where power efficiency is critical to trigger a GPS fix.

According to an unrepresented embodiment, the pressure reading are not stored for further processing in memory 100, but analyzed in real time as they are sampled, to detect the flight signature. This variant would use less memory, but at the cost of powering up more sections of the GNSS processor to analyze every new sample.

The invention provides an improved user experience by shortening the Time to First Fix after air travel. It is an enhancement to existing solutions in that it uses an additional input into the traditional algorithms to detect a condition (air travel) that the traditional algorithms cannot cope with without compromising performance under normal conditions

The invention claimed is:

1. A satellite radiolocalization device, comprising:
a barometric pressure determination unit configured to determine pressure data inside a pressurized aircraft;
a memory configured to store the pressure data;
the radiolocalization device configured to detect a pressure pattern of the pressurized aircraft based in part on the stored pressure data, wherein the pressure pattern comprises a plurality of pressure readings over time;
wherein the satellite radiolocalization device is configured to estimate a duration of an air travel of the pressurized aircraft based on the pressure pattern, and to determine a position uncertainty based at least in part on the duration; and
wherein the satellite radiolocalization device is further configured to determine the position uncertainty based on the presence of said pressure pattern, the pressure pattern indicating (a) a phase of rapid initial pressure drop, (b) a phase of constant pressure, and (c) a phase of rapid pressure increase.

2. The satellite radiolocalization device of claim 1, wherein the satellite radiolocalization device is configured to detect coordinates of a registered airport at landing and estimate the position uncertainty based upon the coordinates.

3. The satellite radiolocalization device of claim 1, wherein the satellite radiolocalization device is further configured to estimate the position uncertainty based upon the pressure data at landing.

4. The satellite radiolocation device of claim 1, wherein the radiolocation device is configured to estimate the duration of the air travel using the duration of the phase of constant pressure.

5. A satellite radiolocalization device, comprising:
means for storing pressure data;
means for determining barometric pressure inside a pressurized aircraft in which the means for storing pressure data stores the pressure data from the means for determining barometric pressure, the radiolocalization device configured to detect a pressure pattern in the pressurized aircraft based in part on the stored pressure data;
wherein the satellite radiolocalization device is configured to estimate a duration of an air travel of the pressurized aircraft based on the pressure pattern, and to determine a position uncertainty based at least in part on the duration;
wherein the satellite radiolocalization device is further configured to determine the position uncertainty based on the presence of the pressure pattern, wherein the pressure pattern comprises a plurality of pressure readings over time, the pressure readings indicating (a) a phase of rapid initial pressure drop, (b) a phase of constant pressure and (c) a phase of rapid pressure increase; and
wherein the satellite radiolocalization device is configured to select a satellite search strategy based at least in part on the detected pressure pattern.

6. The satellite radiolocalization device of claim 5, wherein the satellite radiolocalization device is configured to detect coordinates of a registered airport at landing and estimate the position uncertainty based upon the coordinates.

7. A method for satellite radiolocalization comprising:
determining a barometric pressure inside a pressurized aircraft with a barometric pressure determination unit, with a memory configured to store pressure data when in a low-power mode;
placing the barometric pressure determination unit in the low-power mode;
storing the pressure data in the memory;
detecting a pressure pattern in the pressurized aircraft based in part on the stored pressure data, wherein the pressure pattern comprises a plurality of pressure readings over time, the pressure readings indicating (a) a phase of rapid initial pressure drop, (b) a phase of constant pressure and (c) a phase of rapid pressure increase;
estimating a duration of an air travel based on the pressure pattern; and
determining a position uncertainty based at least in part on the duration.

8. The method of claim 7, further comprising detecting coordinates of a registered airport at landing, and estimating the position uncertainty based upon the coordinates.

9. A non-transient computer readable medium comprising program code configured to:
determine pressure data inside a pressurized aircraft with a barometric pressure determination unit comprising a low-power mode;
place the barometric pressure determination unit in the low-power mode;
store the pressure data in a memory;

detect a pressure pattern in the pressurized aircraft based in part on the stored pressure data;

estimate a duration of an air travel based on the pressure pattern;

determine a position uncertainty based at least in part on the duration; and select a satellite search strategy at an end of the low-power mode based at least in part on the detected pressure pattern.

10. The computer readable medium of claim 9, further comprising program code configured to detect coordinates of a registered airport at landing, and estimate the position uncertainty based upon the coordinates.

\* \* \* \* \*